US012475984B2

(12) United States Patent
Valuck et al.

(10) Patent No.: US 12,475,984 B2
(45) Date of Patent: Nov. 18, 2025

(54) TECHNIQUES FOR PROVIDING INTERACTIVE CLINICAL DECISION SUPPORT FOR DRUG DOSAGE REDUCTION

(71) Applicant: RxAssurance Corporation, Denver, CO (US)

(72) Inventors: Robert Valuck, Denver, CO (US); Thomas C. Ennis, Denver, CO (US)

(73) Assignee: RXASSURANCE CORPORATION, Denver, CO (US)

(*) Notice: Subject to any disclaimer, the term of this patent is extended or adjusted under 35 U.S.C. 154(b) by 324 days.

(21) Appl. No.: 16/985,972

(22) Filed: Aug. 5, 2020

(65) Prior Publication Data

US 2021/0043293 A1 Feb. 11, 2021

Related U.S. Application Data

(60) Provisional application No. 62/882,788, filed on Aug. 5, 2019.

(51) Int. Cl.
| | |
|---|---|
| *G16H 20/10* | (2018.01) |
| *A61B 5/00* | (2006.01) |
| *A61B 5/16* | (2006.01) |
| *A61K 31/485* | (2006.01) |
| *A61K 31/5513* | (2006.01) |

(Continued)

(52) U.S. Cl.
CPC ............ *G16H 20/10* (2018.01); *A61B 5/165* (2013.01); *A61B 5/4848* (2013.01); *A61B 5/7267* (2013.01); *A61B 5/7275* (2013.01); *A61K 31/485* (2013.01); *A61K 31/5513* (2013.01); *G06N 3/045* (2023.01); *G06N 3/08* (2013.01); *G16H 10/60* (2018.01); *G16H 40/67* (2018.01);

(Continued)

(58) Field of Classification Search
CPC ........ G16H 20/10; G16H 40/67; G16H 10/60; G16H 50/70; G16H 50/20; G16H 70/40; G16H 70/20; A61B 5/165; A61B 5/4848; A61B 5/7267; A61B 5/7275; A61K 31/485; A61K 31/5513; G06N 3/0454; G06N 3/08
USPC .......................................................... 705/2
See application file for complete search history.

(56) References Cited

U.S. PATENT DOCUMENTS

| | | | |
|---|---|---|---|
| 11,587,657 B2 * | 2/2023 | Hopkins | G16H 10/60 |
| 2006/0089592 A1 * | 4/2006 | Kadhiresan | G16H 20/13 |
| | | | 128/923 |

(Continued)

*Primary Examiner* — Marc Q Jimenez
*Assistant Examiner* — Rachael Sojin Stone
(74) *Attorney, Agent, or Firm* — ArentFox Schiff LLP

(57) ABSTRACT

Examples described herein generally relate to recommending drug dosage reductions for a patient. A computer system may generate an initial non-linear glide path of recommended dosages starting at an initial dosage of a drug for a patient and ending at a goal dosage at an estimated time of arrival. The system may receive periodic patient monitoring including at least one drug withdrawal scale score, anxiety scale score, and indicated side effect. The system may determine, using one or more machine learning algorithms, a revised glide path based on a data record for the patient, the at least the drug withdrawal scale score and the at least one anxiety scale score for the patient. The system may recommend at least one medication or therapy for the indicated side effect. The system may determine a prescription adjustment based on the revised glide path.

20 Claims, 8 Drawing Sheets

(51) Int. Cl.
*G06N 3/045* (2023.01)
*G06N 3/08* (2023.01)
*G16H 10/60* (2018.01)
*G16H 40/67* (2018.01)
*G16H 50/20* (2018.01)
*G16H 50/70* (2018.01)
*G16H 70/20* (2018.01)
*G16H 70/40* (2018.01)

(52) U.S. Cl.
CPC ............ *G16H 50/20* (2018.01); *G16H 50/70* (2018.01); *G16H 70/20* (2018.01); *G16H 70/40* (2018.01)

(56) References Cited

U.S. PATENT DOCUMENTS

| | | | |
|---|---|---|---|
| 2008/0201173 A1* | 8/2008 | Takehara | G16H 20/10 705/3 |
| 2008/0255098 A1* | 10/2008 | Dunn | A61K 31/519 514/249 |
| 2014/0249844 A1* | 9/2014 | Liberty | G16H 10/60 705/2 |
| 2014/0364839 A1* | 12/2014 | Shelton | A61M 5/14276 604/891.1 |
| 2015/0343144 A1* | 12/2015 | Altschul | A61M 31/002 604/503 |
| 2016/0103975 A1* | 4/2016 | Gairani | G06Q 40/08 705/2 |
| 2016/0198996 A1* | 7/2016 | Dullen | A61B 5/6832 600/595 |
| 2018/0008593 A1* | 1/2018 | Leyendecker | A61K 9/28 |
| 2018/0264191 A1* | 9/2018 | Dagdeviren | A61M 25/0084 |
| 2020/0022416 A1* | 1/2020 | Alarcon | A61M 15/0028 |
| 2020/0093749 A1* | 3/2020 | Lai | A61K 9/4866 |
| 2021/0043293 A1* | 2/2021 | Valuck | G06N 20/20 |
| 2021/0301346 A1* | 9/2021 | Johnson | A61K 45/06 |
| 2024/0408004 A1* | 12/2024 | Maggio | A61K 47/186 |

\* cited by examiner

TECHNIQUES FOR PROVIDING INTERACTIVE CLINICAL DECISION SUPPORT FOR DRUG DOSAGE REDUCTION

CLAIM OF PRIORITY UNDER 35 U.S.C. § 119

This application claims priority to U.S. Provisional Application No. 62/882,788 titled "TECHNIQUES FOR PROVIDING INTERACTIVE CLINICAL DECISION SUPPORT FOR DRUG DOSAGE REDUCTION," filed Aug. 5, 2019, which is assigned to the assignee hereof, and incorporated herein by reference in its entirety.

BACKGROUND

The present disclosure relates to decision support for doctors, and particularly to recommendations for drug dose reduction.

70,237 drug overdose deaths occurred in the United States in 2017. The age-adjusted rate of overdose deaths increased significantly by 9.6% from 2016 (19.8 per 100,000) to 2017 (21.7 per 100,000). Opioids—mainly synthetic opioids (other than methadone)—are currently the main driver of drug overdose deaths. Opioids were involved in 47,600 overdose deaths in 2017 (67.8% of all drug overdose deaths). Addiction to opioids (clinically referred to as Opioid Use Disorder, or OUD) is more common than previously thought, and affects between 1-5% of the U.S. population. Opioid prescribing comprises 9% of all prescribing in the U.S., and most individuals who become addicted or overdose began with prescribed opioids.

Increasing concern about the risks and limited evidence supporting the therapeutic benefit of long-term opioid therapy for chronic non-cancer pain are leading prescribers to consider discontinuing the use of opioids. In addition to overt addiction or diversion, the presence of adverse effects, diminishing analgesia or potential development of hyperalgesia, reduced function and quality of life, or the absence of progress toward functional goals can justify an attempt at weaning patients from long-term opioid therapy. However, discontinuing opioid therapy is often hindered by patients' psychiatric comorbidities and poor coping skills, as well as the lack of formal guidelines for the prescribers.

The current state of the art for opioid tapering involves a "one size fits all" approach patients for opioids, i.e., every patient receives a printed, fixed, linear reduction schedule and set time frame to achieve an end goal, such as cut 10% per week, or 20% per week based on the initial patient status (i.e. at the starting point of the taper). Many times, these are a static schedule with no specific doses. Some vendors offer more specific app-based input, with printed schedules based on the drug, current dose, desired time frame for taper, and a linear slope of line diagram, plus a schedule of when to take what dose of the medication. Current failure rates for opioid reduction taper are estimated to be 67% (33% abandon the taper, 34% resume the opioid within 6 months).

Thus, there is a need in the art for improvements in decision support for pharmacological administration. In particular, there is a need for systems and methods for providing decision support regarding drug dose reduction.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

In an example, the disclosure provides a method of providing interactive clinical decision support for drug dosage reduction. The method may include generating an initial non-linear glide path of recommended dosages starting at an initial dosage of a drug for a patient and ending at a goal dosage at an estimated time of arrival. The method may include receiving periodic patient monitoring including at least one drug withdrawal scale score, at least one anxiety scale score, and at least one indicated side effect. The method may include determining, using one or more machine learning algorithms, a revised glide path based on a data record for the patient, the at least the drug withdrawal scale score and the at least one anxiety scale score for the patient. The method may include recommending at least one medication or therapy for the indicated side effect. The method may include determining a prescription adjustment based on the revised glide path.

In another aspect, the disclosure may include a system for providing interactive clinical decision support for drug dosage reduction. The system may include a memory storing computer-executable instructions and a processor configured to execute the computer-executable instructions. The processor may generate an initial non-linear glide path of recommended dosages starting at an initial dosage of a drug for a patient and ending at a goal dosage at an estimated time of arrival. The processor may receive periodic patient monitoring including at least one drug withdrawal scale score, at least one anxiety scale score, and at least one indicated side effect. The processor may determine, using one or more machine learning algorithms, a revised glide path based on a data record for the patient, the at least the drug withdrawal scale score and the at least one anxiety scale score for the patient. The processor may recommend at least one medication or therapy for the indicated side effect. The processor may determine a prescription adjustment based on the revised glide path.

In another aspect, the disclosure provides a non-transitory computer readable medium storing computer-executable instructions. The non-transitory computer readable medium may include instructions to generate an initial non-linear glide path of recommended dosages starting at an initial dosage of a drug for a patient and ending at a goal dosage at an estimated time of arrival. The non-transitory computer readable medium may include instructions to receive periodic patient monitoring including at least one drug withdrawal scale score, at least one anxiety scale score, and at least one indicated side effect. The non-transitory computer readable medium may include instructions to determine, using one or more machine learning algorithms, a revised glide path based on a data record for the patient, the at least the drug withdrawal scale score and the at least one anxiety scale score for the patient. The non-transitory computer readable medium may include instructions to recommend at least one medication or therapy for the indicated side effect. The non-transitory computer readable medium may include instructions to determine a prescription adjustment based on the revised glide path.

Additional advantages and novel features relating to implementations of the present disclosure will be set forth in part in the description that follows, and in part will become

DETAILED DESCRIPTION

Figure 1:
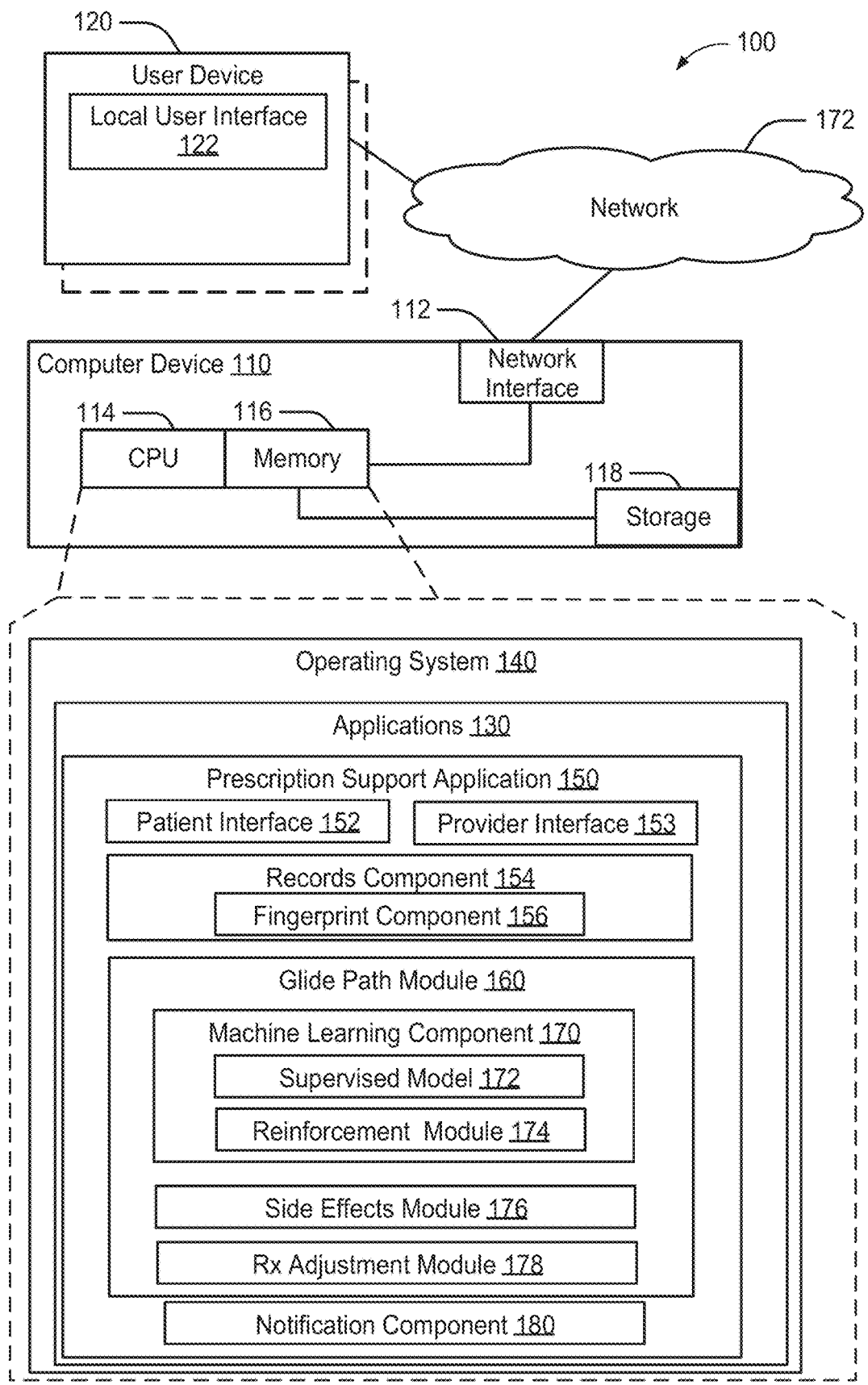
FIG. 1 is a diagram of an example computer system for providing interactive clinical decision support for drug dosage reduction, in accordance with an implementation of the present disclosure.

The present disclosure provides systems and methods for providing prescription support for pharmacological administration. The disclosure provides techniques that allow a computer system provider to support a health care provider in making decisions regarding prescribing drugs or drug combinations for a patient. In particular, the present disclosure provides methods and systems for drug dosage tapering for drugs that are difficult for patients to stop taking. For example, the techniques disclosed herein may be used for patients currently taking a drug including but not limited to an opioid, a benzodiazepine, a non-benzodiazepine sleep medication, an antidepressant, a proton pump inhibitor, an anti-psychotic, or other drug having withdrawal symptoms.

In an aspect, the prescription support may relate to a patient diagnosed with or having indicators of a likely substance use disorder. In one aspect of the invention, the substance use disorder may be an opioid use disorder. Opioid Use Disorder is a diagnosis introduced in the fifth edition of the Diagnostic and Statistical Manual of Mental Disorders, DSM-5. It combines two disorders from the previous edition of the Diagnostic and Statistical Manual, the DSM-IV-TR, known as Opioid Dependence and Opioid Abuse, and includes a wide range of illicit and prescribed drugs of the opioid class. Although the generic term, Opioid Use Disorder, is given in the DSM-5, the guidelines indicate that the actual opioid drug being used by the individual is specified in the diagnosis.

A tapered drug dosage may be used to reduce a prescribed dosage for a patient. Conventionally, doctors may provide patients with a tapered drug schedule based on a fixed reduction percentage over a time period. However, such schedules do not reflect and recalibrate for withdrawal symptoms, other side effects, patient anxiety, or mood changes. There is often no doctor-patient interaction and consultation for adjusting the schedule. A fixed endpoint creates an all-or-nothing approach that can contribute to anxiety of the patient and/or failure of the taper.

Current failure rates for opioid reduction taper are estimated to be 67% (33% abandon the taper, 34% resume the opioid within 6 months). Patients fail to successfully taper off of opioids primarily because of a fear of pain, anxiety, side effects, and the lack of a customized, individual, adjustable glide path treatment that reflects their experience and preferences during tapering. The lack of clinical decision support tools that provide real time monitoring and evidence-based adjustments to their tapering treatment, also contribute to low tapering success rates.

The present disclosure provides a system, methods and computer programs that provide interactive, real time clinical decision support, driven by specification of therapeutic goals, calculation of an initial glide path for dosage reduction, ongoing assessment of the patient's clinical condition, and machine learning to provide periodic glide path adjustments (as necessary) to optimize drug dosage reduction for each patient and their unique circumstances. The present disclosure includes a variable endpoint target to reflect the difficulties faced in the latter portion of opioid reduction therapy. Additionally, the system of the present disclosure may relieve patient anxiety and fear of withdrawal with education and personalized, adjustable goals and therapy, as patients become an empowered participants in the determination and adjustments to their personalized treatment program to achieve targeted success.

In an aspect, the disclosure provides system and methods of generating glide paths of recommended dosages starting at a current dosage for a patient and ending at a goal dosage at an estimated time of arrival. The glide paths may be periodically evaluated and updated as necessary based on patient provided inputs regarding, for example, withdrawal symptoms, anxiety, and side effects.

Referring now to FIG. 1, an example prescription support system 100 includes a central computer device 110 and a plurality of user devices 120. The central computer device 110 may be, for example, any mobile or fixed computer device including but not limited to a computer server, desktop or laptop or tablet computer, a cellular telephone, a personal digital assistant (PDA), a handheld device, wearable, or any other computer device having wired and/or wireless connection capability with one or more other devices, or any other type of computerized device capable of processing pharmacological related data. In an aspect, the central computer device 110 may be implemented as one or more virtual machines hosted by a web services provider.

In an aspect, the prescription support system 100 may include a prescription support application 150 executed by the computer device 110. The prescription support system 100 may recommend a glide path of dosages for a patient and/or suggest alternative therapies for withdrawal symptoms, side effects, or anxiety. The glide path may be a non-linear, multi-segmented glide path. The prescription support application 150 may include a patient interface 152 that receives input from a patient or health care provider, a provider interface 153 that provides the glide path to a health care provider, a records component 154 that accesses a plurality of data records associated with the patient; and a glide path module 160 that analyses the plurality of data records using one or more machine-learning algorithms to generate or adjust the glide path. In an aspect, the machine-learning algorithms may include a supervised model 172 and a reinforcement module 174.

The computer device 110 may include a central processing unit (CPU) 114 that executes instructions stored in memory 116. For example, the CPU 114 may execute an operating system 140 and one or more applications 130, which may include a prescription support application 150. The computer device 110 may also include a network interface 112 for communication with external devices via a network. For example, the computer device 110 may communicate with a plurality of user devices 120.

Memory 116 may be configured for storing data and/or computer-executable instructions defining and/or associated with an operating system 140 and/or application 130, and CPU 114 may execute operating system 140 and/or application 130. Memory 116 may represent one or more hardware memory devices accessible to computer device 110. An example of memory 116 can include, but is not limited to, a type of memory usable by a computer, such as random access memory (RAM), read only memory (ROM), tapes, magnetic discs, optical discs, volatile memory, non-volatile memory, and any combination thereof. Memory 116 may store local versions of applications being executed by CPU 114. In an implementation, the memory 116 may include or communicate with a storage device 118, which may be a non-volatile memory.

In an aspect, the storage device 118 may include a blockchain storage. The blockchain storage may store immutable records by allowing append operations only such that the records are sequenced. Further, the records may use hash chaining such that each record may be cryptographically verified to provide data security. In an implementation, the blockchain storage may be distributed or duplicated across devices. In an aspect, the blockchain storage may be utilized for smart contracts. For example, a patient consent record may be stored in the blockchain storage and verified when records for the patient are accessed.

The CPU 114 may include one or more processors for executing instructions. An example of CPU 114 can include, but is not limited to, any processor specially programmed as described herein, including a controller, microcontroller, application specific integrated circuit (ASIC), field programmable gate array (FPGA), system on chip (SoC), or other programmable logic or state machine. The CPU 114 may include other processing components such as an arithmetic logic unit (ALU), registers, and a control unit. The CPU 114 may include multiple cores and may be able to process different sets of instructions and/or data concurrently using the multiple cores to execute multiple threads. In an aspect, a graphics processing unit (GPU) may perform some operations of the CPU 114. For example, for blockchain operations, a GPU may be utilized for mining blocks (e.g., finding hash keys).

The operating system 140 may include instructions (such as applications 130) stored in memory 116 and executable by the CPU 114. The applications 130 may include a prescription support application 150 configured to generate a glide path of recommended doses, periodically evaluate the glide path, and update the glide path when necessary.

The prescription support application 150 may include a patient interface 152 that may be in communication with or otherwise operate in conjunction with a local user interface 122 on a user device 120. The patient interface 152 may be any user interface with which an end user may interact. For example, the patient interface 152 may be an application or operating system that runs on the user devices 120. The prescription support application 150 may be associated or in communication with an online store or update service. Accordingly, the prescription support application 150 may occasionally publish an updated version of the patient local user interface 122. As another example, the patient interface 152 may be a web-page that is accessed through a browser application executed on the user devices 120. By loading the web-page, the browser application may effectively operate as a user interface for an application executed on the computer device 110 (e.g., in the case of a web server).

In an aspect, the patient interface 152 may acquire patient monitoring information for a patient. For example, the patient interface 152 may obtain scores from one or more standardized assessment scales for clinically diagnosed conditions including, but not limited to pain, function, anxiety, depression, sleep, as recorded on scales such as PEG-3 (pain intensity (P), interference with enjoyment of life (E), and interference with general activity (G)), GAD-7 (Generalized Anxiety Disorder 7 item), PHQ-9 (Patient Health Questionnaire 9), SOWS (Subject Opioid Withdrawal Scale), COWS (Clinical Opioid Withdrawal Scale), etc. In another example, patient data may be accessed and recorded from a wearable. The patient data may include biometric vital signs, including, but not limited to heart rate, heart rate variability, blood pressure, respiration, and temperature. Such patient data may be used to calculate or update clinically diagnosed conditions including, but not limited to pain, function, anxiety, depression, and sleep. In an aspect, for recommending a glide path for an opioid, the assessment scales may include at least one drug withdrawal scale score, at least one anxiety scale score, and at least one indicated side effect. For example, the patient interface 152 may generate a survey or questionnaire that may be completed directly by a patient operating the user device 120, or may be completed by a medical provider based on answers provided by the patient. In an aspect, the patient interface 152 may calculate a score for a respective scale based on the patient provided answers.

The provider interface 153 may include the same functionality as the patient interface 152 for the provider to enter information on behalf of a patient. The provider interface 153 may also provide tools for tracking the progress of one or more patients. For example, the provider interface 153 may allow the provider to configure alert conditions and provide alerts when any patient of the provider meets the alert conditions. For instance, a provider may set an alert condition to generate an alert any time a patient reports a drug withdrawal scale score or an anxiety score above a threshold. As another example, the provider may set an alert condition to receive a notification when a patient has not submitted information for a period of time.

The prescription support application 150 may include a records component 154. The records component 154 may access a plurality of data records for a patient, provider, payer, or drug. The records component 154 may correlate and consolidate the records based on an accuracy rating of each data source. For example, an electronic health record (EHR) may be considered a highest level of truth, but may be supplemented with information from other sources such as a state prescription drug monitoring program (PDMP), electronic patient reported outcome (ePRO), toxicology lab test results, medical and pharmacy claims, medication history, FDA drug information (including the FDA-approved prescribing information for drug products), or health insurance information.

In an aspect, the prescription support application 150 may include a fingerprint component 156 that generates a data fingerprint of collected data records used to determine a recommended glide path. The system generated data 'fingerprint' may include auditable data keys, including, but not limited to, API's, transactions, permissions, and timestamped information of all relevant data accessed and used in any manner to create and deliver clinical decision support recommendations including a glide path. The fingerprint component 156 may generate a fingerprint for each set of data records provided to the glide path module 160.

The glide path module 160 may analyze a set of data records to provide a recommended glide path. The glide path may indicate a dosage for a patient over a reduction period. The dosage may be a daily dosage, or a smaller increment. In an aspect, an initial glide path may start at a current dosage for the patient and end at a goal dosage. The goal dosage may be selected by a health care provider based on needs of a patient taking into consideration laws, regulations, and payer requirements. For example, a patient with chronic pain may not be able to completely eliminate opioid pain medications, so the goal dosage may be a lower dosage that is recommended for the chronic condition or a dosage that will be covered by the payer. In another aspect, the goal may be based on a percentage reduction from the current dose. The glide path module 160 may determine an estimated time of arrival at the goal dosage. Accordingly, the reduction period may be defined between a start date and the estimated time of arrival. For example, the estimated time of arrival may be a first day at the goal dosage according to the initial glide path. Because the glide path may be adjusted based on monitored conditions, the estimated time of arrival may also change.

The glide path module 160 may include a machine learning component 170 that generates a glide path for a patient using one or more machine learning algorithms. As used herein, the term machine-learning algorithm may refer to executable code that is executed by a computer processor to process one or more elements of a data record and produce a defined result. A machine-learning algorithm may include a machine-learning model that is trained to produce the defined result. For example, the machine-learning model may include various operations and state information that reflects training of the model. Example machine-learning algorithms may include supervised learning, unsupervised learning, reinforcement learning, feature learning, sparse dictionary learning, anomaly detection, and association rules. Example models may include artificial or digital neural networks, decision trees, support vector machines, Bayesian networks, and genetic algorithms.

In an aspect, for example, the machine learning component 170 may include a supervised model 172 and a reinforcement module 174. The supervised model 172 may be a machine-learning model (e.g., an artificial neural network) trained to determine whether a glide path is likely to be successful for a patient. For example, the supervised model 172 may be trained using supervised learning techniques in which past examples of patient data and glide paths (or other prescription regimens) are labeled with a result. The result may be based on whether the patient met a defined goal and/or whether the patient satisfied the goal at a later time (e.g., 6 months after an end of the reduction). The supervised model 172 may be used to evaluate a suggested glide path. For example, the suggested glide path may be based on guidelines for the particular drug. The supervised model 172 may provide an estimated likelihood of success of the suggested glide path.

The glide path module 160 may also include a reinforcement module 174 that applies reinforcement learning to adjust factors of a glide path. For example, a reward function may reward the reinforcement module 174 when an adjustment improves the predicted success of a glide path, or when an adjusted glide path produces a successful treatment. Conversely, the reward function may punish adjustments that result in a lower predicted likelihood of success, or adjusted glide paths that result in failed treatments (e.g., abandonment of the reduction or resumed/increased use of the drug). The reinforcement module 174 may learn to make adjustments that increase the estimated and actual success of a glide path. Accordingly, by applying the supervised model 172 and the reinforcement module 174, the machine learning component 170 may tailor a glide path for a particular patient.

The glide path module 160 may evaluate and/or update a glide path during the reduction period. The glide path module 160 may periodically receive patient monitoring information via the patient interface 152. For example, the patient monitoring information may include at least one opioid withdrawal scale score, at least one anxiety scale score, and at least one indicated side effect. As another example, the patient monitoring information may include patient data collected from a wearable device. Because the dosage for the patient is changing during the reduction period, changes to the patient monitoring information are expected. The supervised model 172 may be used to evaluate the current glide path based on the most recent monitoring information to determine a current likelihood of success of the current glide path. If the supervised model 172 predicts a likelihood below a threshold, the machine learning component 170 may use the reinforcement module 174 to adjust the glide path. The adjustments by the reinforcement module 174 during the reduction period may operate in a similar manner as adjustments to the initial glide path. That is, the reinforcement module 174 may make adjustments that are predicted to improve the likelihood of a successful treatment. In an aspect, the patient monitoring information may be given a greater weight during the reduction period for adjusting the glide path.

The glide path module 160 may include a side effects module 176 that provides recommendations for treatments for one or more side effects reported by a patient. For example, the treatments for side effects may include adjunctive measures, such as over the counter medications for side effect symptom management, or prescription drug options for side effect symptom management, schedule and dosage. The treatments for side effects may also include adjunctive or alternative medications for pain management (e.g., as an opioid dosage is tapered, introduce an alternative medication to replace the analgesic effect). In another aspect, alternatives to opioids (ALTO) or non-pharmacologic therapy options may be recommended or available for consideration.

The glide path module 160 may include a prescription adjustment module 178 that determines a prescription adjustment recommendation based on the revised glide path based on a remaining drug supply of the patient. In an aspect, the glide path may include non-standard dosages. A pharmacy may fulfill a prescription using a combination of pills and/or capsules. When the glide path is adjusted, the patient may still have a remaining drug supply for all or a portion of the reduction period. The prescription adjustment module 178 may determine a current supply of prescribed medication that can satisfy doses according to the revised glide path. For example, the prescription adjustment module 178 may determine which doses in the revised glide path can be satisfied by doses in the current supply. The prescription adjustment module 178 may recommend prescribing additional doses for unsatisfied doses of the revised glide path.

The prescription support application 150 may include a notification component 180 that provides notifications to patients and/or health care providers. In an aspect, a patient may enter the periodic monitoring information via the patient interface 152 without consulting the prescribing health care provider. The glide path module 160 may monitor for alert conditions regarding the periodic monitoring information. For example, the alert conditions may include determining a revised glide path, a change in reported withdrawal symptoms or anxiety, or a newly reported side effect. When the glide path module 160 detects an alert condition, the notification component 180 may provide an alert to the prescribing health care provider via the provider interface 153. The health care provider may consider any recommendations and determine whether to see the patient. In an aspect, the health care provider may be able to approve an adjusted glide path and/or issue an updated prescription via the provider interface 153. The notification component 180 may also provide an alert to the patient via the patient interface 152, for example, indicating a need to see the health care provider or pick up an updated prescription.

Figure 2:
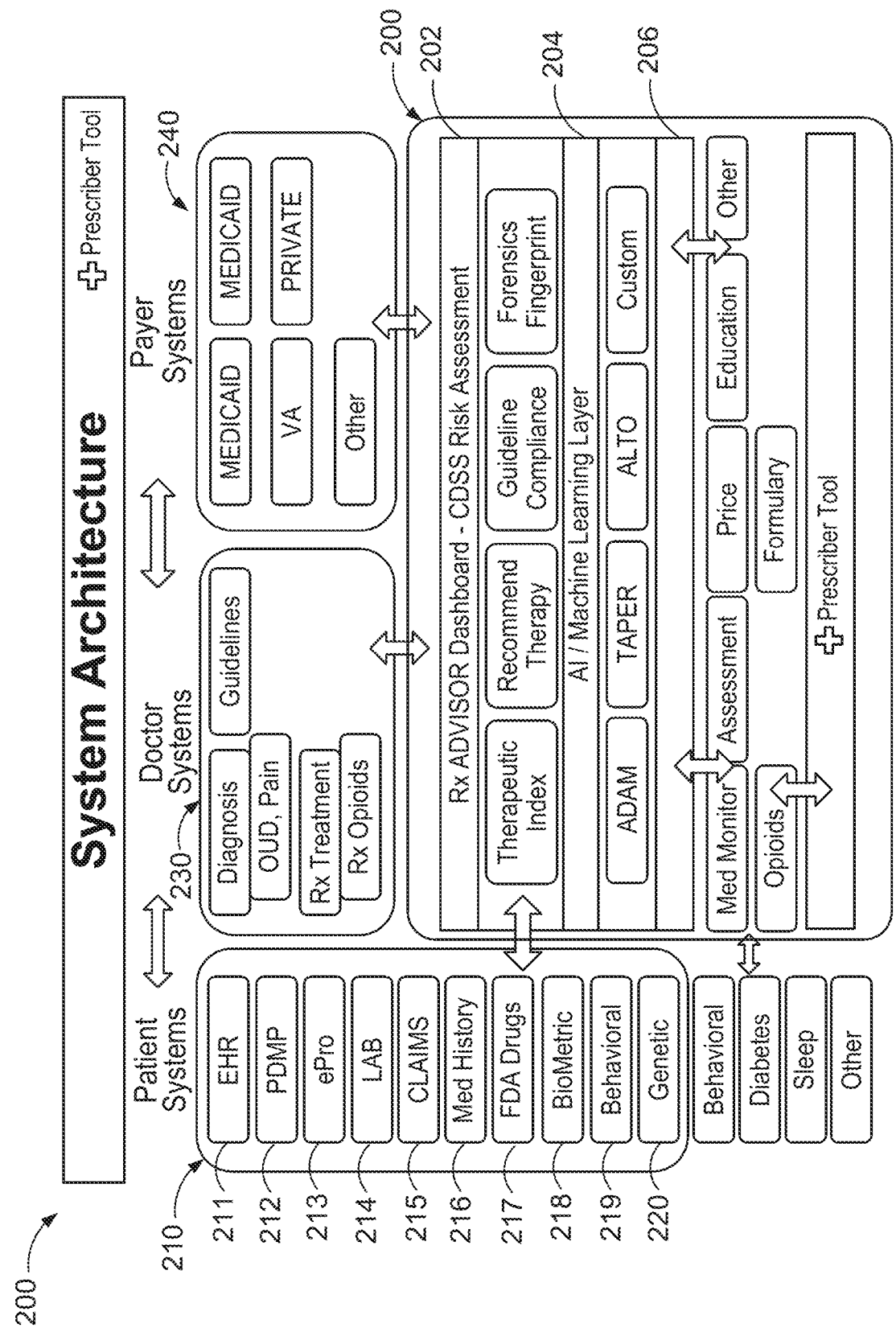
FIG. 2 is a diagram illustrating an example system architecture, in accordance with an implementation of the present disclosure.

FIG. 2 illustrates an example system architecture showing interaction and data transfer between an example pharmacological evaluation system 200, patient systems 210, a doctor system 230, and payer systems 240.

The pharmacological evaluation system 200 may be an example system for implementing the prescription support system 100. The pharmacological evaluation system 200 may include a prescription advisory dashboard 202 that provides clinical decision support services for risk assessment. The prescription advisory dashboard 202 may be an example of the provider interface 153 and may provide a therapeutic index, recommended therapy, and guideline compliance for data records indicated by a forensics fingerprint. The pharmacological evaluation system 200 may include an AI/Machine Learning layer 204 that corresponds to the machine learning component 170. In an aspect, the AI/Machine Learning layer 204 may include one or more of an automated drug advice and monitoring (ADAM) system, a drug taper system (TAPER), an alternative to opioids (ALTO) system, and custom algorithms. The pharmacological evaluation system 200 may include an API layer that interacts with other systems to acquire data and/or perform specific analysis. For example, the pharmacological evaluation system 200 may utilize an external system to track drug prices and access such a system via the API layer 206. Other services that may be accessed via an API include a medication monitoring system (e.g., for opioids), an assessment system, an education system, and a formulary.

The patient systems 210 may include any system that provides information about a patient. For example, the patient systems 210 may include an electronic health record (EHR) 211, a state prescription drug monitoring program (PDMP) 212, electronic patient reported outcome (ePRO) 213, toxicology lab test results 214, medical and pharmacy claims 215, and medication history 216. In an aspect the patient systems 210 may include access to FDA drug information 217 corresponding to drugs associated with the patient or being considered for the patient. The patient systems 210 may also include information such as biometric information 218, behavioral information 219, and genetic information 220. The behavioral information 219 may include patient reported data from standardized assessment scales for clinically diagnosed conditions including, but not limited to pain, function, anxiety, depression, sleep, as recorded on scales such as PEG-3, GAD-7, PHQ-9, SOWS, COWS, etc. The behavioral information 219 may also include any information collected from a wearable device.

In an aspect, pharmacogenomics can play an important role in identifying responders and non-responders to medications, avoiding adverse events, and optimizing drug dose. The genetic information 220 may include drug labeling, which may contain information on genomic biomarkers and can describe: drug exposure and clinical response variability, risk for adverse events, genotype-specific dosing, mechanisms of drug action, polymorphic drug target and disposition genes, or trial design features. In addition, the pharmacological evaluation system 200 may access chemistry and genetics lab data for patients. Genetics labs can provide an ever increasing set of patient genetic lab data that may be used by the machine learning component 170.

The doctor systems 230 may include information provided by a health care provider. The doctor systems 230 may include a diagnosis, which may indicate opioid use disorder and/or pain, for example. The doctor systems 230 may include a prescribed treatment, which may include prescription opioids. The doctor systems 230 may include guidelines, which may define acceptable treatments for the patient.

The payer systems 240 may include any system for a payer. Example payer systems include a Medicaid system, Medicare system, veterans affairs (VA) system, private insurance, and other payers.

Figure 3:
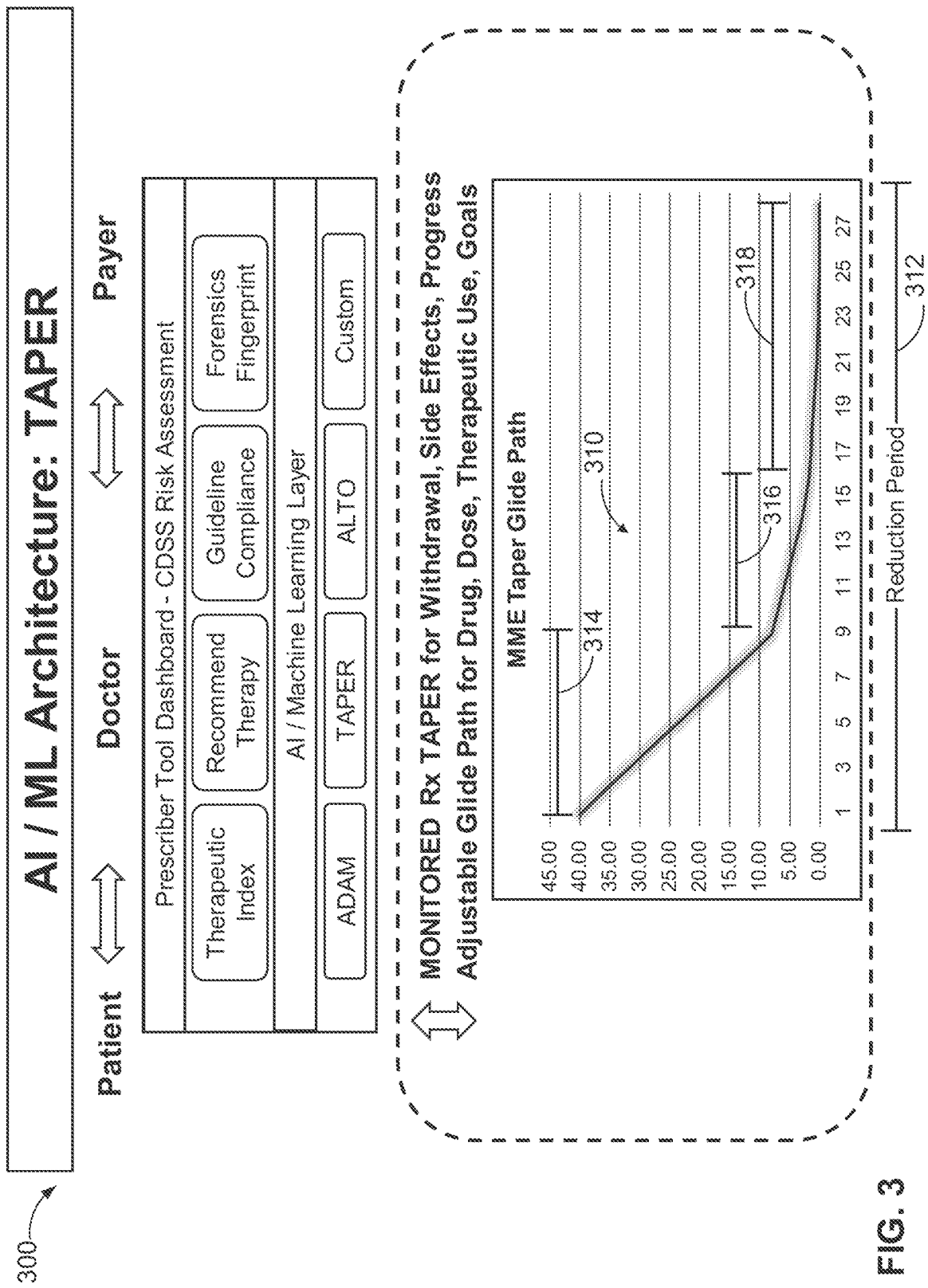
FIG. 3 is a diagram illustrating an example architecture for a machine learning component, in accordance with an implementation of the present disclosure.

FIG. 3 is a diagram illustrating an example architecture for a glide path module 160. The glide path module 160 may include a machine learning component 170 that defines TAPER system 300.

The TAPER system 300 may utilize algorithms and machine learning to calculate an initial tapering glide path, monitor patient condition during the taper, and dynamically adjust the glide path across the span of the taper to achieve optimal results relative the therapeutic goals.

To begin the tapering of a medication, the doctor and patient may be provided with an educational 'Starter Kit' to address some of the patient anxiety concerting the upcoming drug dosage reductions and potential side effects. The Starter Kit may contain items, including, but not limited to lists and/or samples of over the counter drugs and supplies to counter act common side effects such as nausea, vomiting and constipation. Educational materials explain that a successful glide path will most likely involve a gradual process, concluding with a final phase ('flare') of dosage reduction over the last portion of the taper. The dosage reductions may be precisely dosed and may involve increments of dose that are not commercially available. Accordingly, a doctor may need to specifically request a pharmacy to provide exact dosages needed. Therefore, the taper may avoid reliance on inaccurate patient 'pill splitting').

In an aspect, the TAPER system 300 may determine dosages as a morphine milligram equivalent (MME). The TAPER system 300 may include a MME conversion calculator that converts dosages of a drug to a MME. The MME may be utilized for compliance with laws, regulations, or guidelines. The use of an MME may also allow a health care provider to consider an effect of alternative and/or adjunctive drugs.

In an aspect, the glide path 310 may be a non-linear glide path, at least for a portion of the time. Generally, the percentage reduction of the dosage may decrease over the reduction period 312. For example, a glide path may include an initial rapid reduction phase 314, a gradual adjustment phase 316, and a soft landing phase 318. The initial rapid reduction phase 314 may be a linear reduction based on the initial current dosage. For example, the reduction may be a percentage of the initial current dosage per day. The gradual adjustment phase 316 may have a lower reduction than the initial rapid reduction phase. For example, the gradual adjustment phase 316 may include a reduction based on the previous dosage. Accordingly, a percentage reduction would result in a smaller reduction each day. The soft landing phase 318 may slowly approach the goal dosage. For example, the soft landing phase 318 may be a qausi-asymptoptic decrease in last stage of taper; the soft landing phase 318 may be almost an infinite regression to zero. The TAPER system 300 may recommend dosages below the lowest FDA recognized dosage parameters, as there is no longer FDA guidance for this dosage. For example, at the beginning of the soft landing phase 318, the TAPER system 300 may recommend a glide path of 10% reduction in dosage [from 10 mg to 9 mg], followed by 10% reduction of the previous dosage [from 9 mg to 8.1 mg], then 10% reduction from the previous dosage [8.1 mg to 7.29 mg] as the dosages are gradually reduced, incrementally slowing the speed of the parabolic curve in an almost infinite regression, adjusted as side effects are observed.

Figure 4:
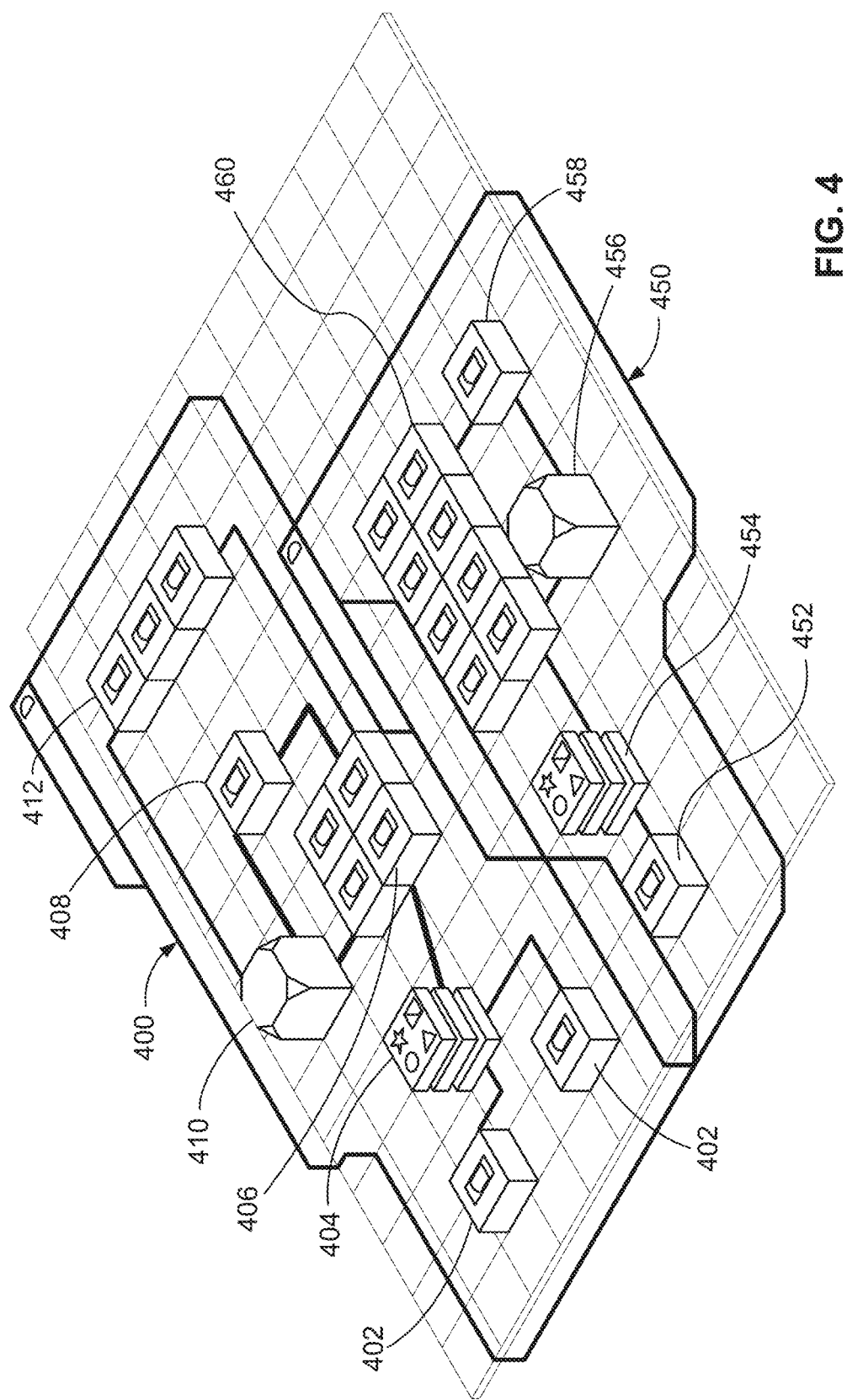
FIG. 4 is a conceptual diagram of an example implementation of a computer system, in accordance with an implementation of the present disclosure.

FIG. 4 illustrates an example of a network or cloud services system 400 for implementing the prescription support system 100. The system 400 may interact with a PDMP system 450, for example, to acquire data records. The system 400 may include one or more API servers 402 that receive requests via an API. For example, the requests may be received from an application executing on a user device 120, or may be received from other servers (e.g., for doctor systems 230 or payer systems 240. An access controller 404 may verify that the request is acceptable, and add the request to worker queues 406. A scheduler 408 may send the requests to a machine-learning server array 412, which may implement the machine learning component 170. The machine-learning server array 412 may access a database 410, which may store the collected data records.

The PDMP system 450 may be an example of a patient system 210 that stores patient data. The system 400 may access the PDMP system 450 via API server 452. The PDMP system 450 may include an access controller 454, workers queues 460, a scheduler 458, and a PDMP database 456.

Figure 5:
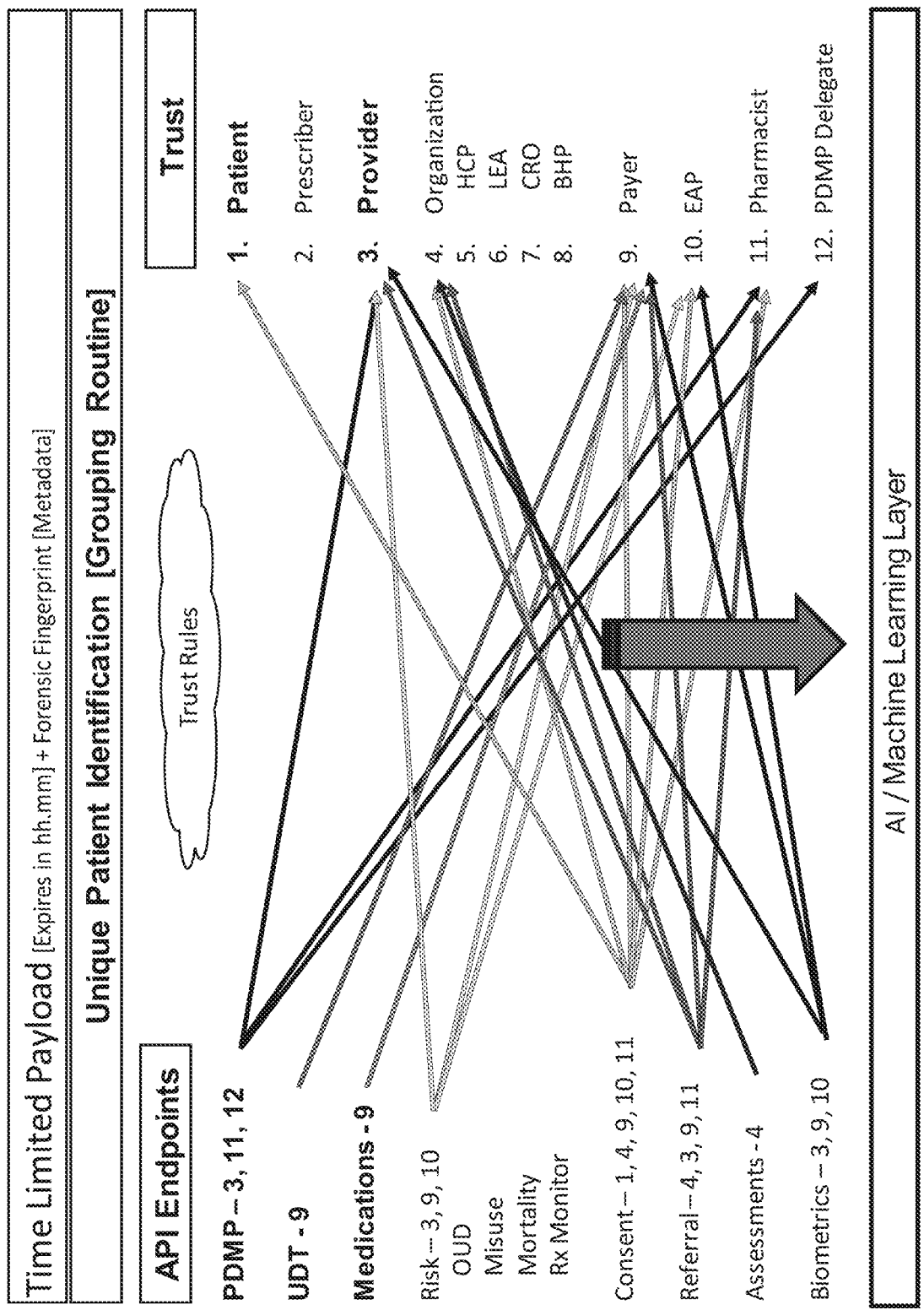
FIG. 5 illustrates example records processing operations, in accordance with an implementation of the present disclosure.

FIG. 5 illustrates an example operation of a records component 154. The records component 154 may generate a time limited payload including a plurality of data records. The time limited payload may have a set expiration time (e.g., when the underlying data is expected to be updated) and a forensic fingerprint. The forensic fingerprint may be a collection of metadata describing the source and timing of the limited time payload.

The records component 154 may identify a unique patient within the data records. For example, data records for a unique patient may use different identification numbers or names within different systems. For example, the records component 154 may identify data records with overlapping elements and conflicting elements. The records component 154 may determine, based on the overlapping elements that the data records are for the same person. The records component 154 may consolidate the data records into a single virtual data record with the conflicting elements represented by a union of the conflicting elements or the conflicting element from a data record with a highest accuracy rating.

The records component 154 may also use trust rules to control the flow of data to various entities. For example, trust rules may define an association between each data source or API endpoint and one or more trusted entities that are allowed to receive data from the API endpoint. The trust rules may be based on contractual (e.g., consent forms) or legal access to certain types of data. When a trusted entity requests an analysis (e.g., by executing one or more machine learning algorithms), the records component 154 may determine whether the data records needed for the particular request are accessible to the entity.

Figure 6:
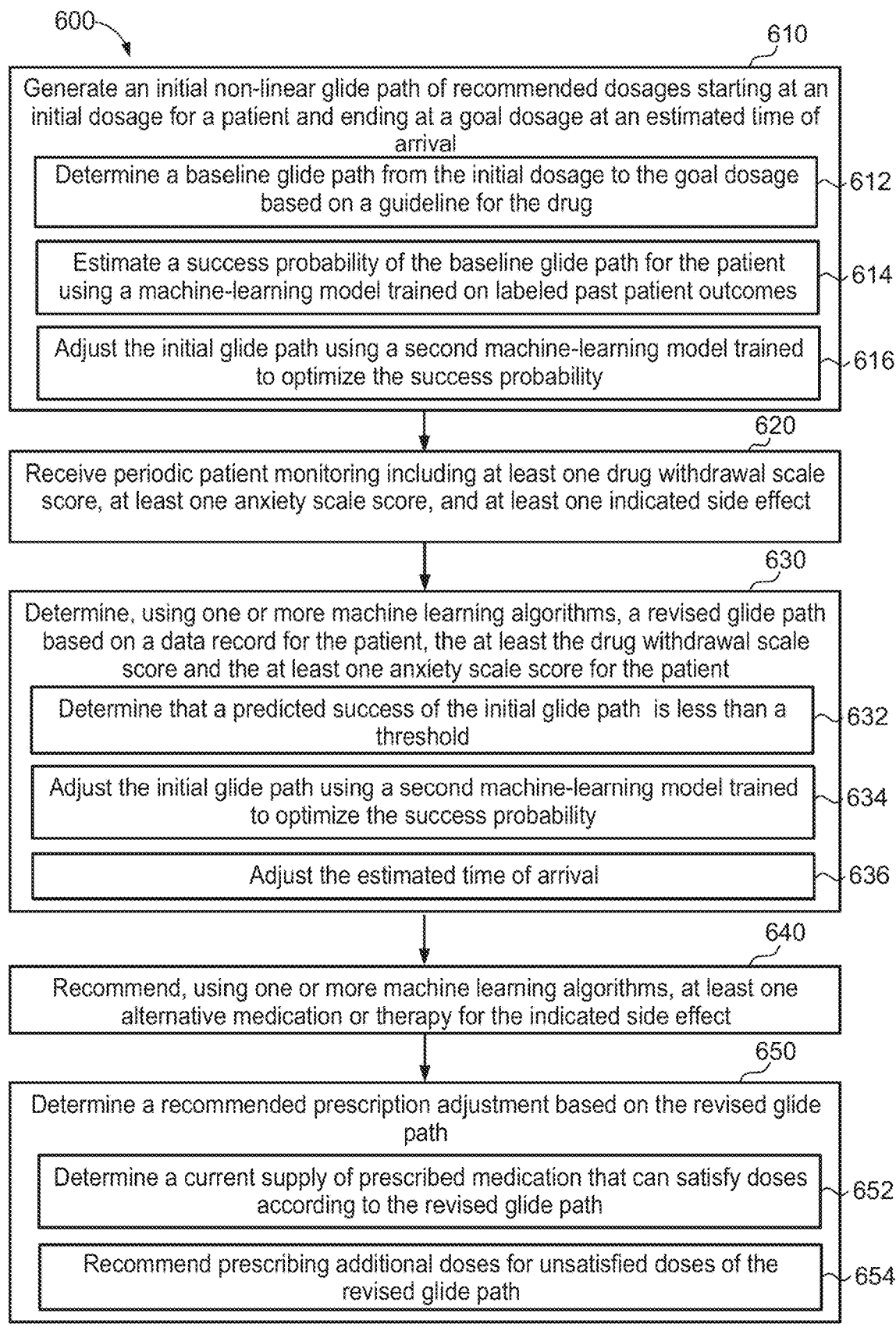
FIG. 6 is a flowchart of an example method of interactive clinical decision support for drug dosage reduction, in accordance with an implementation of the present disclosure.

Turning to FIG. 6, an example method 600 for providing recommended glide paths for drug dosage reduction is illustrated. For example, method 600 may be performed by the prescription support application 150 on the computer device 110.

At block 610, the method 600 may include generating an initial non-linear glide path of recommended dosages starting at an initial dosage for a patient and ending at a goal dosage at an estimated time of arrival. In an aspect, for example, the glide path module 160 may generate an initial non-linear glide path of recommended dosages starting at an initial dosage for a patient and ending at a goal dosage at an estimated time of arrival. In an implementation, at sub-block 612 the glide path module 160 may determine a baseline glide path from the initial dosage to the goal dosage based on a guideline for the drug. At sub-block 614, the supervised model 172 may estimate a success probability of the baseline glide path for the patient using a machine-learning model trained on labeled past patient outcomes. At sub-block 616 the reinforcement module 174 may adjust the initial glide path using a second machine-learning model trained to select adjustments that improve the success probability.

At block 620, the method 600 may include receiving periodic patient monitoring including at least one drug withdrawal scale score, at least one anxiety scale score, and at least one indicated side effect. In an aspect, for example, the patient interface 152 may receive periodic patient monitoring including at least one drug withdrawal scale score, at least one anxiety scale score, and at least one indicated side effect.

At block 630, the method 600 may include determining, using one or more machine learning algorithms, a revised glide path based on a data record for the patient, the at least the drug withdrawal scale score and the at least one anxiety scale score for the patient. In an aspect, for example, the machine learning component 170 may determine, using one or more machine learning algorithms, a revised glide path based on a data record for the patient, the at least the drug withdrawal scale score and the at least one anxiety scale score for the patient. In an implementation, at sub-block 632, the supervised model 172 may determine that a predicted success of the initial glide path based on a data record for the patient, the at least the opioid withdrawal scale score and the at least one anxiety scale score for the patient is less than a threshold. In sub-block 634, the reinforcement module 174 may adjust the initial glide path using a second machine-learning model trained to select improvements that improve the success probability. For example, at sub-block 636, the reinforcement module 174 may adjust the estimated time of arrival.

At block 640, the method 600 may include recommending at least one medication or therapy for the indicated side effect. In an aspect, for example, the side effects module 176 may recommend the at least one medication or therapy for the indicated side effect. For example, the side effects module 176 may include an artificial neural network trained to select from a set of treatments based on the indicated side effect, the drug, and the patient record.

At block 650, the method 600 may include determining a prescription adjustment based on the revised glide path. In an aspect, for example, the prescription adjustment module 178 may determine the prescription adjustment based on the revised glide path. For instance, at sub-block 652, the prescription adjustment module 178 may determine a current supply of prescribed medication that can satisfy doses according to the revised glide path. At sub-block 654, the prescription adjustment module 178 may recommend prescribing additional doses for unsatisfied doses of the revised glide path.

Figure 7:
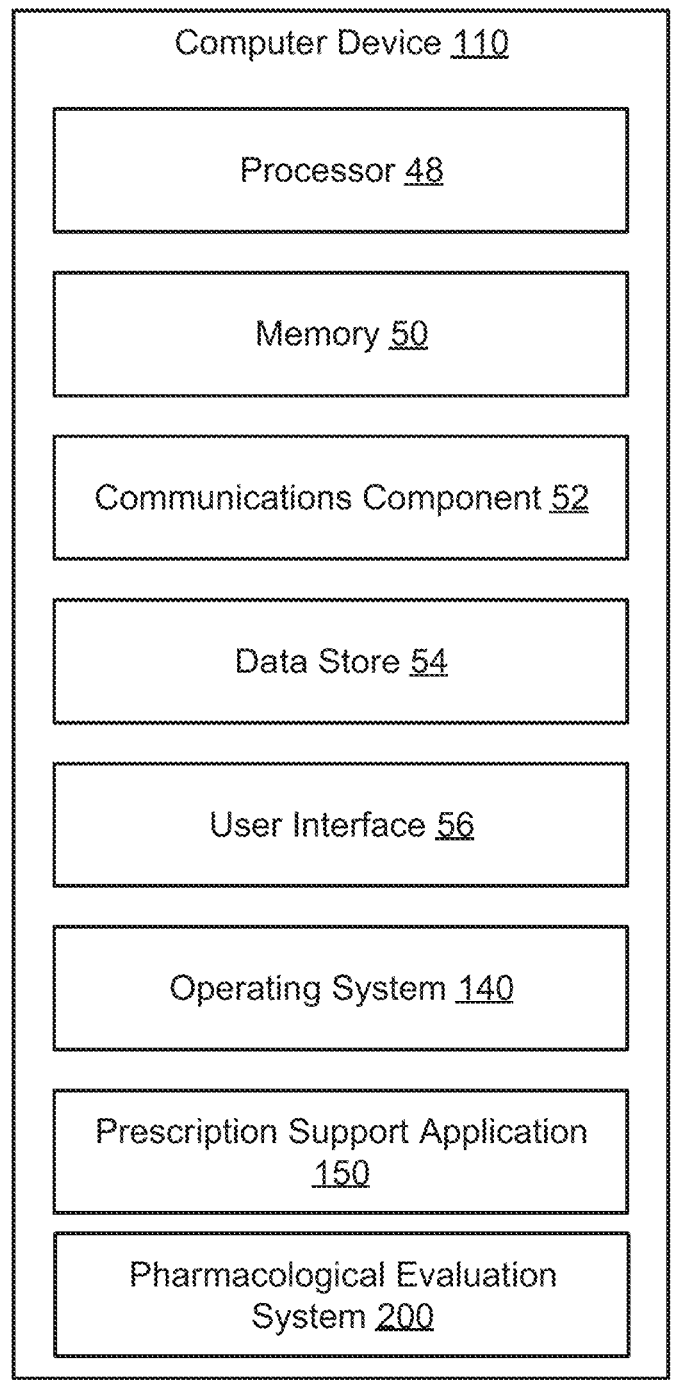
FIG. 7 is a schematic block diagram of an example computer device, in accordance with an implementation of the present disclosure.

Referring now to FIG. 7, illustrated is an example computer device 110 in accordance with an implementation, including additional component details as compared to FIG. 1. In one example, computer device 110 may include processor 48 for carrying out processing functions associated with one or more of components and functions described herein. Processor 48 can include a single or multiple set of processors or multi-core processors. Moreover, processor 48 can be implemented as an integrated processing system and/or a distributed processing system. In an implementation, for example, processor 48 may include CPU 114.

In an example, computer device 110 may include memory 50 for storing instructions executable by the processor 48 for carrying out the functions described herein. In an implementation, for example, memory 50 may include memory 116. The memory 50 may include instructions for executing the prescription support application 150 and/or the pharmacological evaluation system 200.

Further, computer device 110 may include a communications component 52 that provides for establishing and maintaining communications with one or more parties utilizing hardware, software, and services as described herein. Communications component 52 may carry communications between components on computer device 110, as well as between computer device 110 and external devices, such as devices located across a communications network and/or devices serially or locally connected to computer device 110. For example, communications component 52 may include one or more buses, and may further include transmit chain components and receive chain components associated with a transmitter and receiver, respectively, operable for interfacing with external devices.

Additionally, computer device 110 may include a data store 54, which can be any suitable combination of hardware and/or software, that provides for mass storage of information, databases, and programs employed in connection with implementations described herein. For example, data store 54 may be a data repository for operating system 140 and/or applications 130. The data store may include memory 116 and/or storage device 118.

Computer device 110 may also include a user interface component 56 operable to receive inputs from a user of computer device 110 and further operable to generate outputs for presentation to the user. User interface component 56 may include one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, user interface component 56 may include one or more output devices, including but not limited to a display, a speaker, a haptic feedback mechanism, a printer, any other mechanism capable of presenting an output to a user, or any combination thereof.

In an implementation, user interface component 56 may transmit and/or receive messages corresponding to the operation of operating system 140 and/or applications 130. In addition, processor 48 may execute operating system 140 and/or applications 130, and memory 50 or data store 54 may store them.

Figure 8:
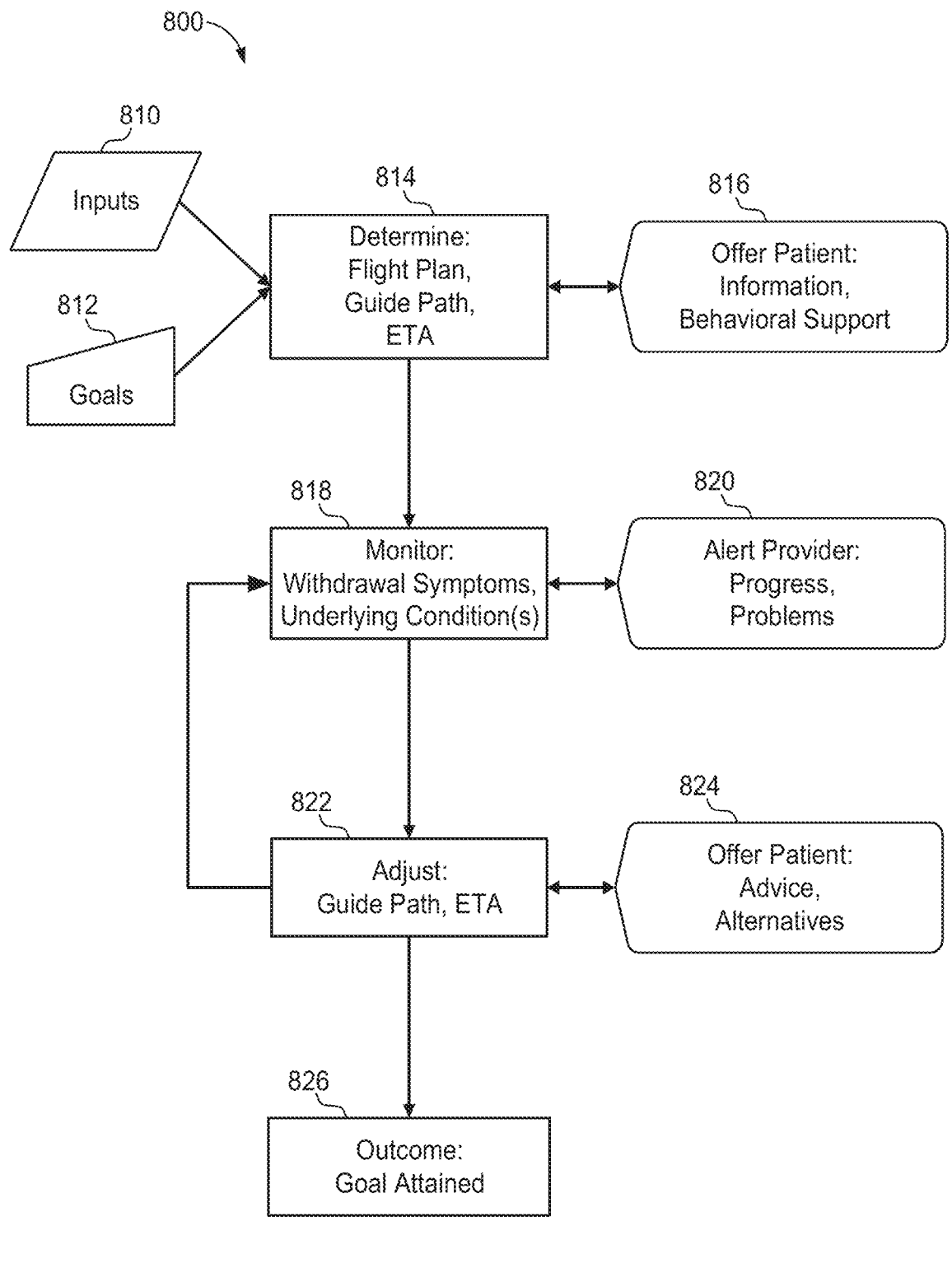
FIG. 8 is a flow diagram illustrating an example experience for a patient.

FIG. 8 is a flow diagram 800 illustrating an example experience for a patient. For example, the patient may be a chronic pain patient, who has been taking opioids for 2 years. Over time, the opioids were increased to their current dosage. The patient may be a candidate for the prescription support system 100.

In block 814 the prescription support system 100 may determine a flight plan, guide path, and ETA based on inputs 810 and goals 812. For example, the inputs may include current dosage such as Oxycodone 80 mg q.i.d.=480 MME per day. The goals 812 may include a doctor specified therapeutic objective such as to taper the patient to a lower dose with a corresponding lower risk (e.g., a dose of less than 90 MME per day). The doctor may be unsure of which glide path to pick and may desire evidence based clinical guidance, which can be provided by the prescription support system 100. For example, the doctor may start at a 10% reduction per month glide path. prescription support system 100 generates customized ETA with a curved flare algorithm at the end.

At block 816, the prescription support system 100 may provide the patient with information about the program including the flight plan, guide path, and ETA. The prescription support system 100 may also provide behavioral support.

At block 818, anticipating potential problems at the end of the glide path, the doctor uses the prescription support system 100 to perform remote and in person monitoring for side effects and withdrawal symptoms. For example, the doctor may start daily patient monitoring for withdrawal effects and anxiety with patient inputs such as SOWS & GAD-2 for 14 days, then every other day for 14 d, then every 3 d. The prescription support system 100 may also measure pain and function using the same schedule as above. At block 820, the prescription support system 100 may provide visual display and/or electronic communication for a series of rule based relevant color-coded alerts for Risks, such as Adherence, Abandonment, Efficacy, for both Patient and Provider. If clinically significant withdrawal symptoms develop, the prescription support system 100 will alert Doctor and dynamically recommend changes to tapering regimen.

For example, in block 822, if the patient at risk of abandonment, the prescription support system 100 may slow or recalibrate the glide path and calculate a revised ETA. In block 824, the prescription support system 100 may also recommend in flight adjunctive alternative measures, based on best practices and guidelines. For instance, the prescription support system 100 may recommend education to reduce anxiety and fear, recommend over the counter medications for side effects, or recommend prescription medications as adjunctive treatments.

Also in block 822, the prescription support system 100 may provide on-demand in-house or network-based video and/or telehealth support, for the patient and/or doctor. The prescription support system 100 may factor in the patient's emotional state, patient's financial state, and patient's cultural state. For instance, the prescription support system 100 may recommend pharmacy consult for medication management, such as: specialty dosage, formulation, and/or administration, or recommendations for OTC management of symptoms, side effects. As another example, the prescription support system 100 may recommend behavioral consult for anxiety management, such as: cognitive behavioral therapy (CBT), mindfulness-based cognitive therapy (MBCT), or ALTO, such as therapeutic music to reduce anxiety, fear.

In block 826, the prescription support system 100 may monitor adjustments to achieve a successful outcome as defined by the provider and patient goals and the ETA.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. A person skilled in the art should understand and appreciate that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a GPU, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or procedure described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or procedure may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A method of treating withdrawal symptoms associated with reduced dosage of a drug, comprising:
   providing a patient, with access to a prescription support application configured to:
   generate, an initial non-linear glide path of recommended dosages starting at an initial dosage of the drug associated with the withdrawal symptoms of the patient and ending at a goal dosage at an estimated time of arrival based on a guideline for the drug;
   receive, from a patient interface, periodic patient monitoring including at least one drug withdrawal scale score, at least one anxiety scale score, and at least one indicated side effect;
   determine, using one or more machine learning algorithms, a revised glide path starting at a current dosage of the drug associated with the withdrawal symptoms and ending at the goal dosage at a new estimated time of arrival based on a data record for the patient, the at least one drug withdrawal scale score and the at least one anxiety scale score for the patient, wherein determining the revised glide path comprises:
  estimating a success probability of the initial non-linear glide path for the patient by applying a machine-learning model trained on labeled past outcomes of glide paths for other patients with withdrawal symptoms for the drug to the data record for the patient, the at least one drug withdrawal scale score, and the at least one anxiety scale score for the patient; and
  determining that the estimated success probability of the initial non-linear glide path is less than a threshold probability;
recommending at least one medication or therapy for the indicated side effect;
determining a prescription adjustment of the drug for the patient based on the revised glide path; and
administering doses of the drug to the patient according to the adjusted prescription based on the revised glide path until reaching the goal dosage,
wherein the withdrawal symptoms are associated with a diagnosed Opioid Use Disorder, wherein the Opioid Use Disorder is specified for an opioid pain medication previously prescribed to the patient, wherein the drug is the opioid pain medication previously prescribed to the patient, and wherein the drug comprises a synthetic opioid other than methadone.

2. The method of claim 1, wherein generating the initial non-linear glide path of recommended dosages comprises:
  adjusting the initial non-linear glide path using a second machine-learning model trained to select adjustments that improve the success probability.

3. The method of claim 1, wherein determining the revised glide path, using one or more machine learning algorithms, comprises adjusting the initial glide path using a second machine-learning model trained to select adjustments that improve the estimated success probability.

4. The method of claim 1, wherein determining, using one or more machine learning algorithms, the revised glide path comprises adjusting the estimated time of arrival.

5. The method of claim 1, wherein determining the prescription adjustment based on the revised glide path comprises:
  determining a current supply of prescribed medication that can satisfy doses to the revised glide path; and
  recommending prescribing additional doses for unsatisfied doses of the revised glide path.

6. The method of claim 1, wherein recommending the at least one medication or therapy for the indicated side effect comprises using an artificial neural network trained to select from a set of treatments based on the indicated side effect, the drug, and the patient record.

7. The method of claim 1, wherein the initial non-linear glide path includes an initial linear phase, a gradual adjustment phase, and a soft landing phase.

8. The method of claim 1, wherein the drug is one of: an opioid, a benzodiazepine, a non-benzodiazepine sleep medication, an antidepressant, or a proton pump inhibitor.

9. A system for treating withdrawal symptoms associated with a reduced dosage of a drug, comprising:
  a memory storing computer-executable instructions; and
  a processor configured to execute the computer-executable instructions to:
    generate an initial non-linear glide path of recommended dosages starting at an initial dosage of the drug associated with the withdrawal symptoms of a patient and ending at a goal dosage at an estimated time of arrival based on a guideline for the drug;
    receive, from a patient interface, periodic patient monitoring including at least one drug withdrawal scale score, at least one anxiety scale score, and at least one indicated side effect;
    determine, using one or more machine learning algorithms, a revised glide path starting at a current dosage of the drug associated with the withdrawal symptoms and ending at the goal dosage at a new estimated time of arrival based on a data record for the patient, the at least one drug withdrawal scale score and the at least one anxiety scale score for the patient, wherein to determine the revised glide path, the processor is configured to:
      estimate a success probability of the initial non-linear glide path for the patient by applying a machine-learning model trained on labeled past outcomes of glide paths for other patients with withdrawal symptoms for the drug to the data record for the patient, the at least one drug withdrawal scale score, and the at least one anxiety scale score for the patient; and
      determine that the estimated success probability of the initial non-linear glide path is less than a threshold probability;
    recommend at least one medication or therapy for the indicated side effect; and
    determine a prescription adjustment of the drug for the patient based on the revised glide path,
  wherein the drug is a drug being used by the patient based on a previous prescription, wherein the prescription adjustment for the patient is a number of doses of the drug for administration to the patient until reaching the goal dosage, wherein the withdrawal symptoms are associated with a diagnosed Opioid Use Disorder, wherein the Opioid Use Disorder is specified for an opioid pain medication previously prescribed to the patient, wherein the drug is the opioid pain medication previously prescribed to the patient, and wherein the drug comprises a synthetic opioid other than methadone.

10. The system of claim 9, wherein the processor is configured to execute the instructions to:
  adjust the initial glide path using a second machine-learning model trained to select adjustments that improve the success probability.

11. The system of claim 9, wherein the processor is configured to execute the instructions to adjust the initial glide path using a second machine-learning model trained to select adjustments that improve the estimated success probability.

12. The system of claim 9, wherein the processor is configured to execute the instructions to adjust the estimated time of arrival.

13. The system of claim 9, wherein the processor is configured to execute the instructions to:
  determine a current supply of prescribed medication that can satisfy doses according to the revised glide path; and
  recommend prescribing additional doses for unsatisfied doses of the revised glide path.

14. The system of claim 9, wherein the processor is configured to execute the instructions to use an artificial neural network trained to select from a set of treatments based on the indicated side effect, the drug, and the patient record.

15. The system of claim 9, wherein the initial non-linear glide path includes an initial linear phase, a gradual adjustment phase, and a soft landing phase.

16. The system of claim 9, wherein the drug is one of: an opioid, a benzodiazepine, a non-benzodiazepine sleep medication, an antidepressant, or a proton pump inhibitor.

17. A non-transitory computer readable medium storing computer-executable instructions that when executed by a processor cause the processor to:
- generate an initial non-linear glide path of recommended dosages for treating withdrawal symptoms of a patient starting at an initial dosage of a drug associated with the withdrawal symptoms of the patient and ending at a goal dosage at an estimated time of arrival based on a guideline for the drug;
- receive, from a patient interface, periodic patient monitoring including at least one drug withdrawal scale score, at least one anxiety scale score, and at least one indicated side effect;
- determine, using one or more machine learning algorithms, a revised glide path starting at a current dosage of the drug prescribed to the patient and ending at the goal dosage at a new estimated time of arrival based on a data record for the patient, the at least one drug withdrawal scale score and the at least one anxiety scale score for the patient, wherein the instructions to determine the revised glide path comprise instructions to:
  - estimate a success probability of the initial non-linear glide path for the patient by applying a machine-learning model trained on labeled past outcomes of glide paths for other patients with withdrawal symptoms for the drug to the data record for the patient, the at least one drug withdrawal scale score, and the at least one anxiety scale score for the patient; and
  - determine that the estimated success probability of the initial non-linear glide path is less than a threshold probability;
- recommend at least one medication or therapy of the indicated side effect;
- determine a prescription adjustment of the drug for the patient based on the revised glide path; and
- issue an updated prescription for administration of doses of the drug to the patient based on the revised glide path until reaching the goal dosage,
- wherein the withdrawal symptoms are associated with a diagnosed Opioid Use Disorder, wherein the Opioid Use Disorder is specified for an opioid pain medication previously prescribed to the patient, wherein the drug is the opioid pain medication previously prescribed to the patient, and wherein the drug comprises a synthetic opioid other than methadone.

18. The system of claim 9, wherein the number of doses of the drug includes non-standard doses in increments smaller than commercially available units.

19. The method of claim 1, wherein the one or more machine learning algorithms comprise a supervised learning model.

20. The method of claim 1, wherein the one or more machine learning algorithms comprise an unsupervised learning model.

* * * * *